United States Patent
Kijak et al.

(10) Patent No.: US 10,538,303 B2
(45) Date of Patent: Jan. 21, 2020

(54) SYSTEMS AND METHODS FOR LINKAGE CONTROLLING ACCESS PANEL ON COMMERCIAL AIRCRAFT

(71) Applicant: The Boeing Company, Chicago, IL (US)

(72) Inventors: Mark D. Kijak, St. Charles, MO (US); Timothy J. Winkelmann, Saint Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 310 days.

(21) Appl. No.: 15/638,337

(22) Filed: Jun. 29, 2017

(65) Prior Publication Data

US 2019/0002077 A1 Jan. 3, 2019

(51) Int. Cl.
*B64C 1/14* (2006.01)
*E05C 17/02* (2006.01)
(Continued)

(52) U.S. Cl.
CPC ............ *B64C 1/1446* (2013.01); *E05C 17/02* (2013.01); *E05D 11/06* (2013.01); *E05D 15/04* (2013.01);
(Continued)

(58) Field of Classification Search
CPC . B64C 1/1446; E05D 15/04; E05Y 2900/502; B64D 29/08
See application file for complete search history.

(56) References Cited

U.S. PATENT DOCUMENTS 2,621,359 A * 12/1952 Schuyler ................. E05D 3/127
16/332
4,199,120 A * 4/1980 Bergman .............. B64C 1/1407
244/129.5
(Continued)

FOREIGN PATENT DOCUMENTS

CN 206243444 6/2017

OTHER PUBLICATIONS

Bloxwich (Malaysia) Sdn Bhd Integrated Global Engineering, "Assembly Part—Hood Hinge Multi Link", Mar. 1, 2017, <URL:http://www.bloxwich.com.my/auto-range.asp>, retrieved Jun. 29, 2017, 2 pages.
(Continued)

*Primary Examiner* — Brian M O'Hara
(74) *Attorney, Agent, or Firm* — Haynes and Boone, LLP (57) ABSTRACT

Various techniques are provided for a high clearance hinge linkage. In one example, a system includes a hinge linkage configured to couple to an aircraft beam to an aircraft panel. The hinge linkage includes an aircraft beam fitting configured to couple to a web of the aircraft beam and be disposed between an upper flange and a lower flange of the aircraft beam, an aircraft panel fitting coupled to the aircraft panel, and a plurality of links. The plurality of links couple the aircraft beam fitting to the aircraft panel fitting and are configured to articulate to move the aircraft panel between at least a closed position and an open position. In certain examples, an edge of the aircraft panel is substantially aligned with a portion of the aircraft beam web in the closed position. Additional systems and related methods are also provided.

20 Claims, 8 Drawing Sheets

(51) Int. Cl.
  *E05D 11/06* (2006.01)
  *E05D 15/04* (2006.01)
  *E05D 15/48* (2006.01)
  *E05D 3/06* (2006.01)

(52) U.S. Cl.
  CPC ............... *E05D 15/48* (2013.01); *E05D 3/06* (2013.01); *E05Y 2900/502* (2013.01)

(56) References Cited

U.S. PATENT DOCUMENTS

| | | | |
|---|---|---|---|
| 6,834,834 B2* | 12/2004 | Dazet | B64C 1/1407 16/368 |
| 7,987,558 B2 | 8/2011 | Beckmann et al. | |
| 8,459,594 B2* | 6/2013 | Anger | B64C 39/10 244/118.5 |
| 2007/0045472 A1 | 3/2007 | Erben et al. | |
| 2018/0216379 A1* | 8/2018 | Spoelstra | E05D 3/14 |

OTHER PUBLICATIONS

YouTube, "180 deg concealed hinge", Jan. 9, 2016, <URL:https://www.youtube.com/watch?v=6bMMZq0X29E>, retrieved Jun. 29, 2017, 1 page.

YouTube, "Bench seat hinge 1", Dec. 9, 2016, <URL:https://www.youtube.com/watch?v=eA4mC4Cf2MM>, retrieved Jun. 29, 2017, 1 page.

YouTube, "Composite Hinge", Jun. 1, 2014, <URL:https://www.youtube.com/watch?v=VIHD4iSuZ6k&feature=youtu.be&t=21>, retrieved Jun. 29, 2017, 1 page.

* cited by examiner

SYSTEMS AND METHODS FOR LINKAGE CONTROLLING ACCESS PANEL ON COMMERCIAL AIRCRAFT

TECHNICAL FIELD

The disclosure relates generally to aircraft systems and more specifically to linkages controlling movement of access panels and/or other doors on the aircraft.

BACKGROUND

Existing aircraft access panels do not allow efficient integration into certain portions of aircraft structure. For example, such access panels can include hinges that position the access panels in a manner that requires additional material on the aircraft structure in order for the access panel to fit flush with a surface of the aircraft. In this regard, conventional gooseneck hinges are often configured to fit within a web of a beam of the aircraft structure. However, because such hinges typically require significant vertical clearance, the height of the beam web typically must be increased, resulting in a larger beam than may be otherwise required.

Additionally, as the center of rotation of the hinge is located outside of the beam web on the same side of the beam web as where the access panel is located, an edge of the access panel cannot be extended to be in line with the web of the beam. Accordingly, additional material is required to be present on the bottom of the flange of the beam so that the outer surface of the access panel can be positioned to be flush with the outer surface of the beam. As the access panel covers only a portion of a side of the lower flange of the beam, the access panel in the closed position covers only a small portion of the lower flange and so a seal to fill the gap between the access panel and the structure can be needed to prevent air from leaking into an opening of the access panel. Thus, aircraft weight and complexity is accordingly increased.

SUMMARY

Systems and methods are disclosed for a high clearance hinge linkage. In one example, a system includes a hinge linkage configured to couple to an aircraft beam to an aircraft panel, the hinge linkage including an aircraft beam fitting configured to couple to a web of the aircraft beam and be disposed between an upper flange and a lower flange of the aircraft beam, an aircraft panel fitting coupled to the aircraft panel, and a plurality of links coupling the aircraft beam fitting to the aircraft panel fitting and configured to articulate to move the aircraft panel between at least a closed position and an open position, where an edge of the aircraft panel is substantially aligned with a portion of the aircraft beam web in the closed position.

In another example, a method includes moving an aircraft panel from a closed position to an open position, where movement of the aircraft panel from the closed position to the open position is controlled by a hinge linkage configured to couple an aircraft beam to an aircraft panel, the hinge linkage including an aircraft beam fitting configured to couple to a web of the aircraft beam and be disposed between an upper flange and a lower flange of the aircraft beam, an aircraft panel fitting coupled to the aircraft panel, and a plurality of links coupling the aircraft beam fitting to the aircraft panel fitting and configured to articulate to move the aircraft panel between at least a closed position and an open position, where an edge of the aircraft panel is substantially aligned with a portion of the aircraft beam web in the closed position.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various embodiments of a high clearance hinge linkage that controls movement of an access panel are disclosed herein along with related methods. Such a hinge linkage can be configured to couple to a structural beam of an aircraft to an aircraft panel. The hinge linkage can include a plurality of fittings and links. Such fittings can include an aircraft beam fitting coupled to a web of an aircraft beam and an aircraft panel fitting coupled to an aircraft panel. The plurality of links can include links coupling the aircraft beam fitting to the aircraft panel fitting so that, when the access panel is closed, an edge of the access panel is substantially aligned with a portion of the aircraft beam.

Figure 1:
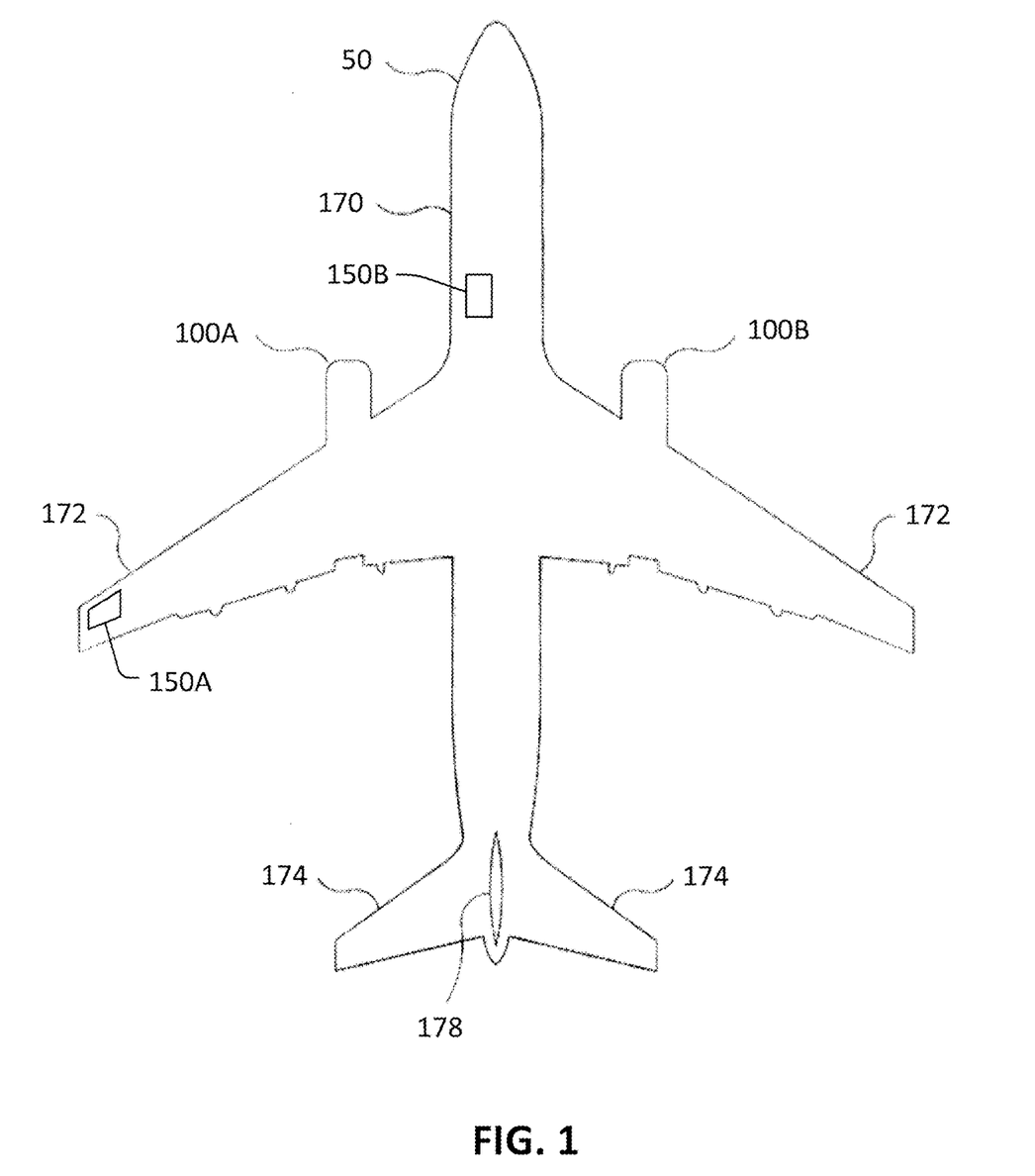
FIG. 1 illustrates an aircraft in accordance with an embodiment of the disclosure.

FIG. 1 illustrates an aircraft 50 in accordance with an embodiment of the disclosure. The aircraft 50 of FIG. 1 includes a fuselage 170, wings 172, horizontal stabilizers 174, aircraft propulsors 100A and 100B, and a vertical stabilizer 178.

One of more access panels can be present on the aircraft 50. For example, aircraft 50 can include access panels 150A and 150B. The access panels can be disposed on any portion of the aircraft 50 and can be configured to cover an opening within the aircraft 50 when closed. For example, the access panel 150A is disposed on wing 172 while the access panel 150B is disposed on the fuselage 170. Various access panels prevent access, when closed, and provide access, when open to one or more components and/or systems within the aircraft 50. Such components and/or systems can include hydraulic lines, electrical lines, mechanical linkages, portions of the aircraft propulsor, fuel lines, structure of the aircraft 50, passenger and cargo compartments, systems for operation of the control surface such as flaps and ailerons, and/or other such components or systems.

The aircraft 50 described in FIG. 1 is exemplary and it is appreciated that in other embodiments, the aircraft 50 may include less or additional components (e.g., no horizontal stabilizer, additional stabilizers, additional sensors, and/or additional controllers). Additionally, concepts described herein may be extended to other aircraft such as helicopters, Unmanned Aerial Vehicles, etc. and/or other vehicles (e.g., automobiles, watercraft, and/or trains).

Figure 2:
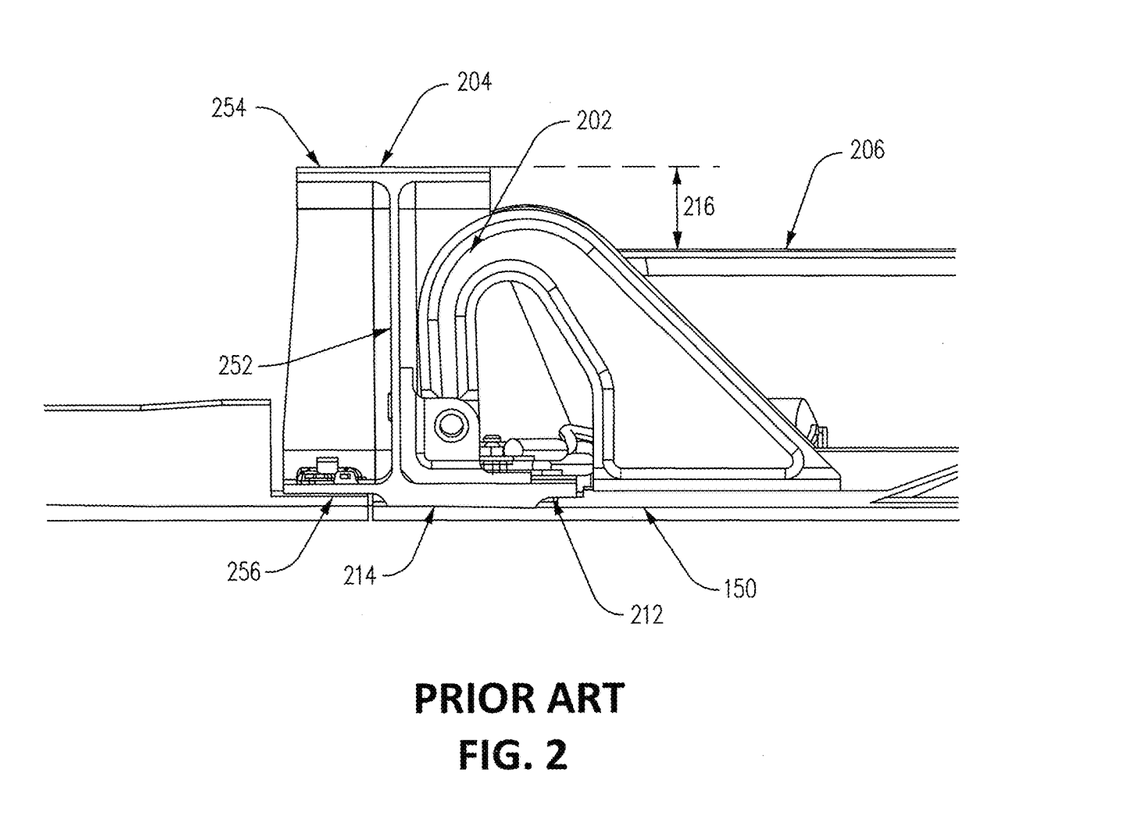
FIG. 2 illustrates a prior art access panel and gooseneck hinge in accordance with an embodiment of the disclosure.

FIG. 2 illustrates a prior art access panel 150 and gooseneck hinge 202 in accordance with an embodiment of the disclosure. In particular, FIG. 2 illustrates a hinge 202 coupled to access panel 150 and an aircraft beam 204.

The aircraft beam 204 is an I-beam style beam that includes an upper flange 254, a lower flange 256, and a web 252. The hinge 202 is coupled to the aircraft beam 204 within the web of the aircraft beam 204. The hinge 202 can be coupled to the web of the aircraft beam 204 via a hinge fitting that allows the hinge 202 to rotate.

The hinge 202 can be coupled to the access panel 150 via a panel fitting. The panel fitting is fixed and, thus, the distance of portions of the access panel 150 to portions of the hinge 202 is fixed (e.g., the access panel 150 does not rotate relative to the hinge 202).

Figure 5:
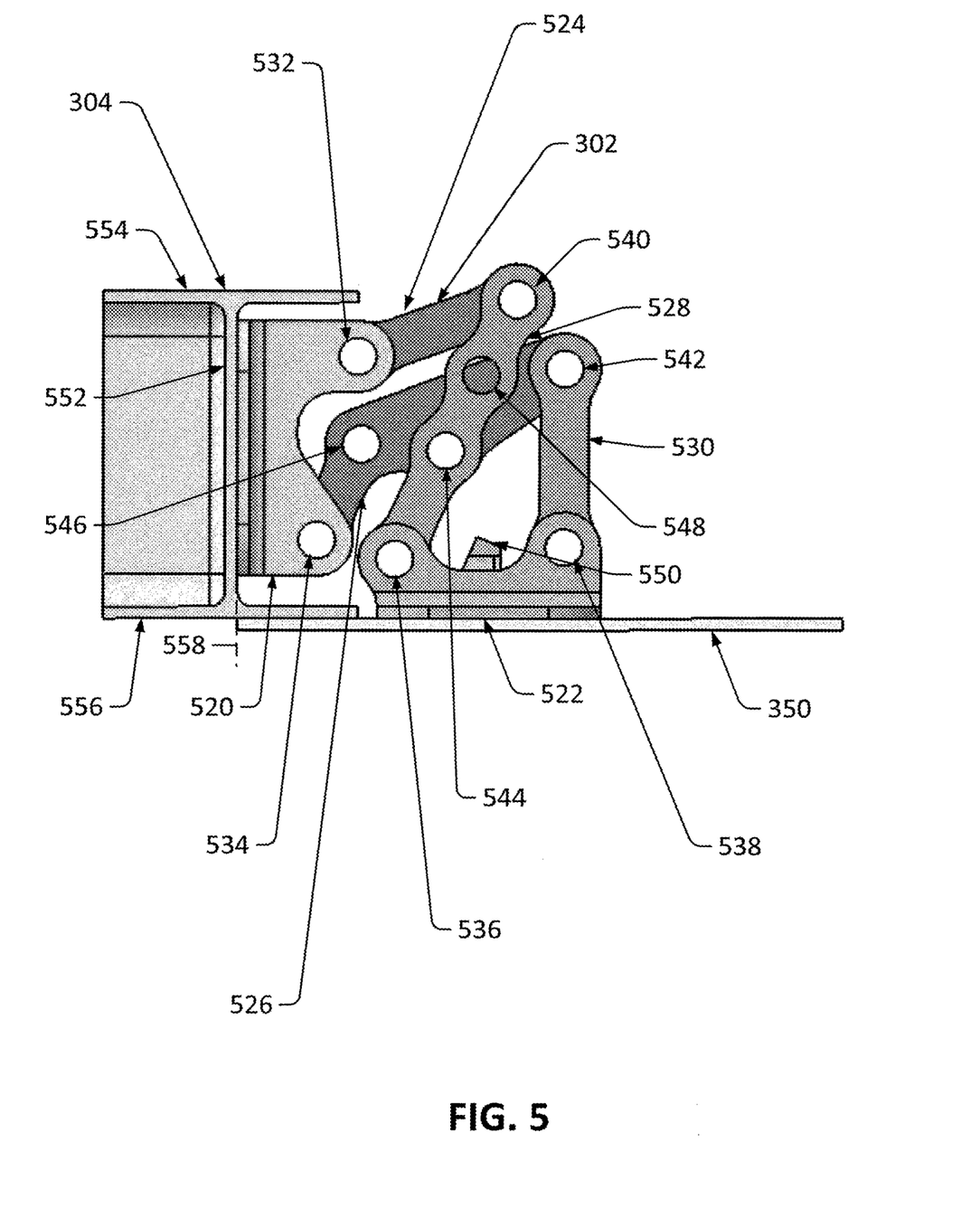
FIG. 5 illustrates a side view of a high clearance hinge linkage coupled to an access panel and aircraft structure in accordance with an embodiment of the disclosure.

Due to the center of rotation of the hinge 202, the access panel 150 cannot be substantially aligned with a portion of the web without the access panel 150 contacting the aircraft beam 204 while opening (e.g., in contrast with the embodiment further discussed with regard to FIG. 5). Accordingly, aircraft beam 204 includes additional beam material 214 on the bottom of the lower flange 256. As the access panel 150 cannot cover an entire side of the lower flange 256 of the aircraft beam 204, additional beam material 214 is required to create a substantially level surface when the access panel 150 is closed and allow for better aerodynamic characteristics. Additional beam material 214 increases the weight of the aircraft beam 204.

Also, as the access panel 150 does not fully cover a side of the lower flange 256 (e.g., the right side portion of the lower flange 256 as shown in FIG. 2) and instead only covers a small portion of the lower flange 256, air is more likely to leak between the lower flange 256 and the access panel 150 when the access panel 150 is closed. Thus, a seal 212 can be required to fully seal the opening covered by the access panel 150. Seal 212 can fully seal the opening of the access panel 150 to prevent or substantially prevent depressurization of an interior of the aircraft 50 and/or outside airflow from bleeding into the interior and affecting the aerodynamics of the aircraft 50 and, thus, increasing drag and fuel consumption of the aircraft 50 and increasing performance of the aircraft 50.

The example shown in FIG. 2 also includes a aircraft beam 206 disposed adjacent to the aircraft beam 204 that is different in height than the aircraft beam 204. As shown in FIG. 2, the aircraft beam 206 is shorter than the aircraft beam 204 by height difference 216. The height difference 216 is due to the gooseneck shape of the hinge 202. As the point of rotation of the hinge 202 is closer to the web of the aircraft beam 204 than the edge of the access panel 150, the gooseneck shape is required so that the access panel 150 and the hinge 202 do not interfere with the aircraft beam 204 when the access panel 150 is opened. However, the gooseneck hinge 202 requires a taller aircraft beam 204 than the aircraft beam 206 disposed adjacent to the aircraft beam 204 so that the hinge 202 can fit within the web of the aircraft beam 204 without interference with the upper flange of the aircraft beam 204. Such a taller height results in a heavier and bulkier aircraft beam 204 than would otherwise be required and thus, decreasing aircraft performance and decreasing available space in the aircraft 50 that could be put to other uses.

Figure 3:
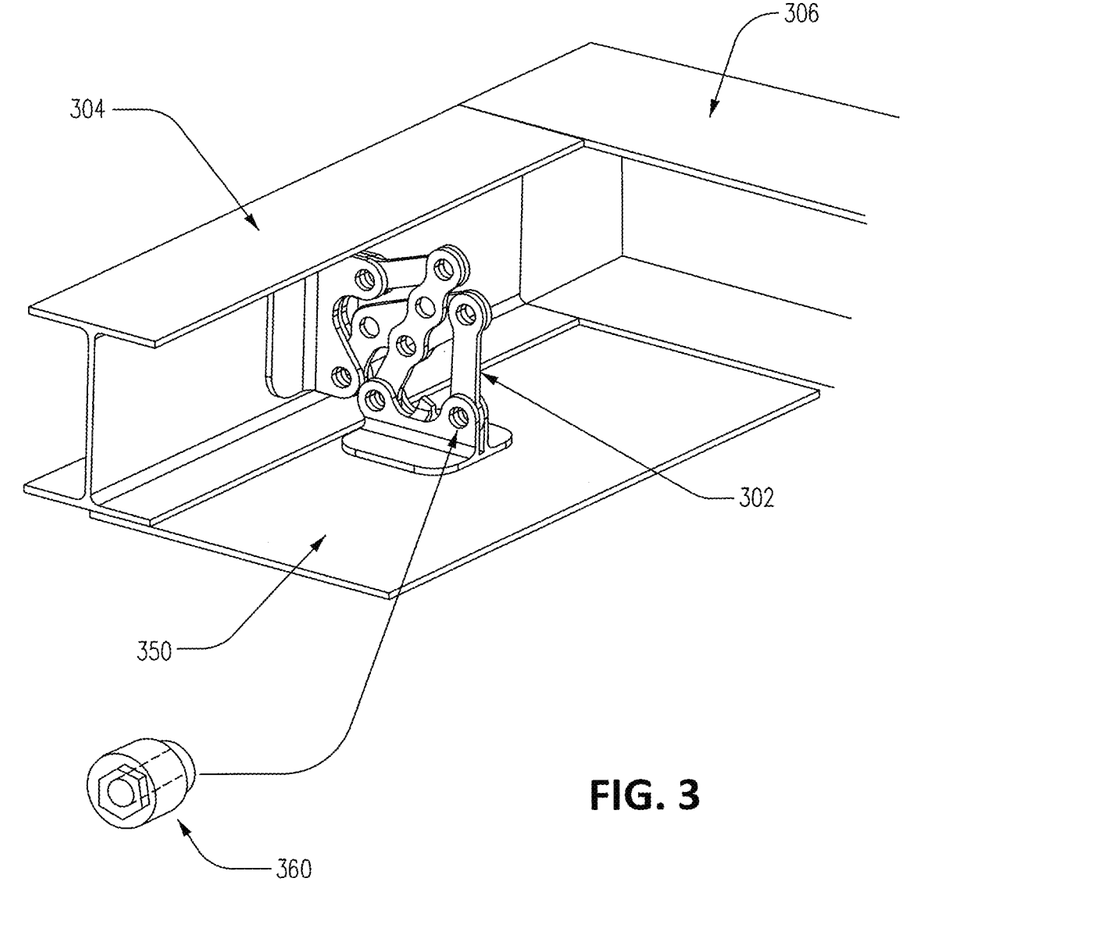
FIG. 3 illustrates a perspective view of a high clearance hinge linkage coupled to an access panel and aircraft structure in accordance with an embodiment of the disclosure.
Figure 4:
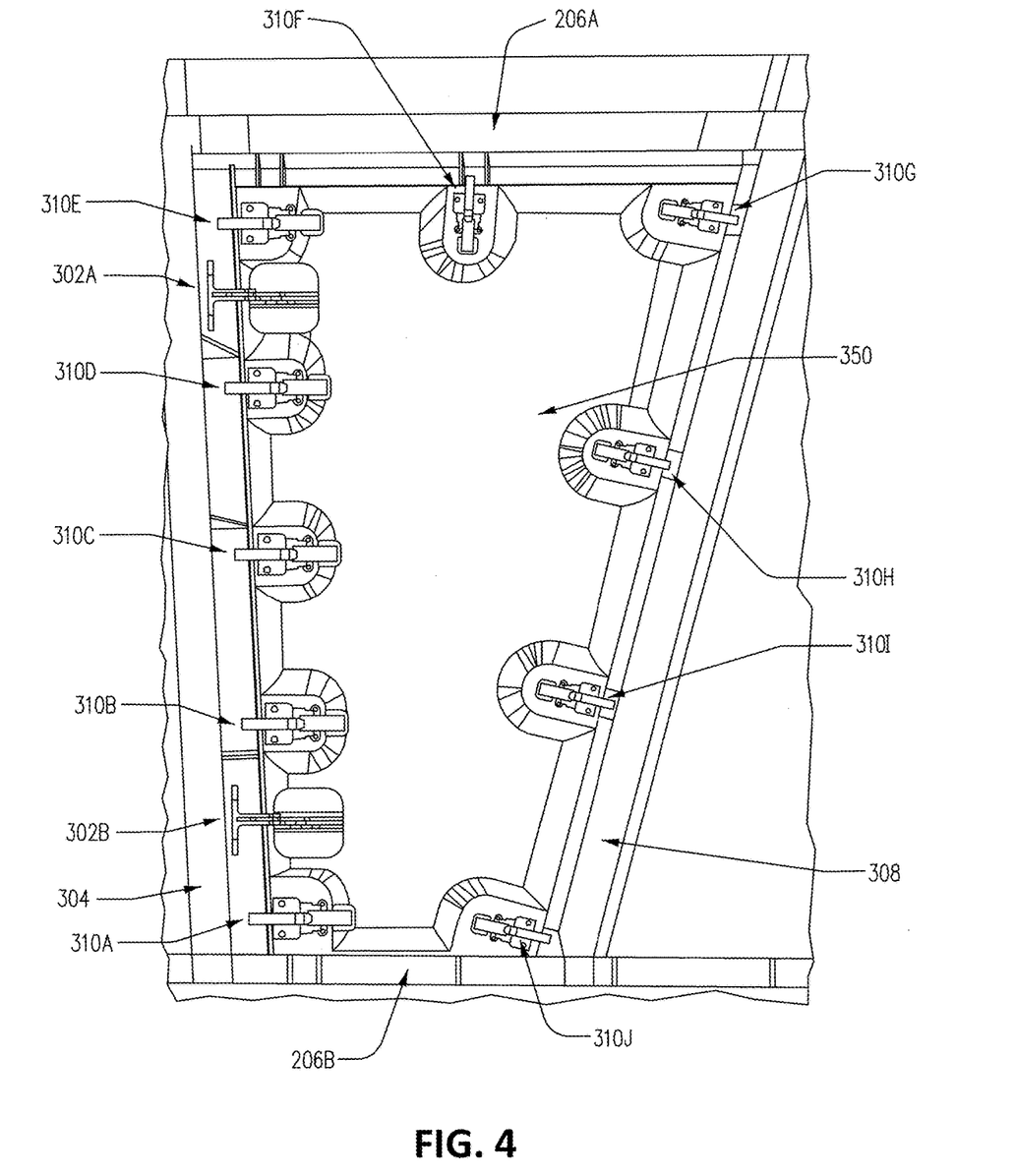
FIG. 4 illustrates an access panel with a high clearance hinge linkage integrated into an aircraft in accordance with an embodiment of the disclosure.

FIG. 3 illustrates a perspective view of a high clearance hinge linkage 302 coupled to an access panel 350 and aircraft structure in accordance with an embodiment of the disclosure. In particular, FIG. 4 shows aircraft beams 304 and 306, the access panel 350, and the high clearance hinge linkage 302. As also shown in FIG. 4, aircraft beams 304 and 306 are of the same height, unlike that of aircraft beams 204 and 206 in FIG. 2.

FIG. 3 also includes additional attachment joint member 360. Attachment joint member 360 can be disposed within one or more attachment points (e.g., upper aircraft beam attachment point 532, lower aircraft beam attachment point 534, first link attachment point 540, second link attachment point 542, third link attachment point 544, forward aircraft panel attachment point 536, and/or rearward aircraft panel attachment point 538 as shown in FIG. 5). Attachment joint member 360 can be, for example, a hinge, a bearing, a dowel within a cylinder, a bolt within a cylinder, forms that allow for relative movement between each other, and/or other such mechanisms that allow for rotation of two components of the high clearance hinge linkage 302 relative to each other.

Additionally, as shown in FIG. 3, due to the high clearance hinge linkage 302, an edge of the access panel 350 is substantially aligned with a portion of the web of the aircraft beam 304, as further illustrated in FIG. 5.

FIG. 4 illustrates an access panel 350 with a high clearance hinge linkage 302 integrated into an aircraft 50 in accordance with an embodiment of the disclosure. In particular, FIG. 3 shows access panel 350, aircraft beams 206A, 206B, 304, and 308, high clearance hinge linkages 302A and 302B, and latches 310A-J.

In FIG. 4, due to the high clearance hinge linkages 302A and 302B being lower in height than hinge 202 shown in FIG. 2, the aircraft beams 206A, 206B, 304, and 308 are all substantially the same height, similar to that shown in FIG. 3. Accordingly, the weight of the aircraft beam 304, to which the high clearance hinge linkages 302A and 302B are coupled to, is less than that of the weight of aircraft beam 204 in FIG. 2.

Additionally, the high clearance hinge linkages 302A and 302B can guide the access panel 350 along a path different from that of hinge 202's path for access panel 150. Hinge 202's path can prevent latches from being installed on the same side of the access panel 150 where the hinge 202 is located, due to the potential for interference between the latches and the aircraft beam 204. However, as the path guided by the high clearance hinge linkages 302A and 302B is different from that of hinge 202's path, latches can be installed on the same side as that of the high clearance hinge linkages 302A and 302B. Accordingly, latches 310A-E are installed on the same side of the access panel 350 as that of high clearance hinge linkages 302A and 302B and the access panel 350 includes latches installed on all of the four sides of the access panel 350.

FIG. 5 illustrates a side view of high clearance hinge linkage 302 coupled to an access panel 350 and aircraft structure in accordance with an embodiment of the disclosure. In particular, FIG. 5 illustrates the aircraft beam 304, the access panel 350, and the high clearance hinge linkage 302. The distances of the beams, fittings, links, and other components shown in FIG. 5 and FIGS. 6A-F are shown to scale, but other examples can include versions of beams, fittings, links, and other components that are of different dimensions than that shown in FIG. 5 and FIGS. 6A-F.

The high clearance hinge linkage 302 couples the aircraft beam 304 to the access panel 350 to allow the access panel 350 to move relative to the aircraft beam 304. The high clearance hinge linkage 302 includes beam fitting 520, panel fitting 522, and a plurality of links. As illustrated in FIG. 5, the plurality of links includes upper aircraft beam link 524, forward aircraft panel link 528, lower aircraft beam link 526, and rearward aircraft panel link 530. Other examples can include more or fewer links and/or links in different configurations than what is illustrated in FIG. 5.

The beam fitting 520 is coupled to the aircraft beam 304. The aircraft beam 304 includes a web 552, an upper flange 554, and a lower flange 556. The web 552 is a portion of the aircraft beam 304 between the upper flange 554 and the lower flange 556. As such, the web 552 forms the center portion of the I-beam shaped aircraft beam 304. The beam fitting 520 of the high clearance hinge linkage 302 couples to the aircraft beam 304 within the web 552. The beam fitting 520 can be coupled to the web 552 via, for example, mechanical fasteners, adhesives such as glues, welding, magnetic connections, mechanisms such as latches, and/or other such connecting techniques. The beam fitting 520 can be configured to couple to the web 552 between the upper flange 554 and the lower flange 556. In certain examples, the beam fitting 520 is securely coupled to the web 552 so that the beam fitting 520 does not substantially move relative to the web 552 during opening and/or closing of the access panel 350.

The panel fitting 522 is coupled to the access panel 350. The panel fitting 522 can be coupled to the access panel 350 via, for example, mechanical fasteners, adhesives such as glues, welding, magnetic connections, mechanisms such as latches, and/or other such connecting techniques. In certain examples, the panel fitting 522 is securely coupled to the access panel 350 so that the panel fitting 522 does not substantially move relative to the access panel 350 during opening and/or closing of the access panel 350.

The plurality of links couples the beam fitting 520 to the panel fitting 522 and allows and controls movement of the panel fitting 522 (and, thus, the access panel 350) relative to the beam fitting 520 (and, thus, the web 552). The plurality of links can include, in a certain example, the upper aircraft beam link 524, the forward aircraft panel link 528, the lower aircraft beam link 526, and the rear aircraft panel link 530.

The upper aircraft beam link 524 is attached to the beam fitting 520 via the upper aircraft beam attachment point 532. As shown, the beam fitting 520 includes two attachment points for links: upper aircraft beam attachment point 532 and lower aircraft beam attachment point 534. The two attachment points can allow the beam fitting 520 to attach to separate links. Other examples can include three or more such attachment points.

As shown, the upper aircraft beam attachment point 532 couples together the beam fitting 520 and the upper aircraft beam link 524 and allows the upper aircraft beam link 524 to move relative to the beam fitting 520. In certain examples, the upper aircraft beam attachment point 532 can include attachment joint member 360 to allow for rotation of the upper aircraft beam link 523 relative to the beam fitting 520.

The upper aircraft beam attachment point 532, as well as other attachment points described herein, can be an attachment point that attaches and allows two objects to move relative to each other (e.g., by fitting attachment joint member 360 within the attachment point). As such, the upper aircraft beam attachment point 532 couples together the beam fitting 520 and the upper aircraft beam link 524 and allows the upper aircraft beam link 524 to move relative to the beam fitting 520.

The upper aircraft beam link 524 is additionally attached to the forward aircraft panel link 528 via a first link attachment point 540. The forward aircraft panel link 528 is also attached to the panel fitting 522 via a forward aircraft panel attachment point 536. As shown, the panel fitting 522 includes two attachment points for links; forward aircraft panel attachment point 536 and rearward aircraft panel attachment point 534. The two attachment points 536 and 538 can allow the panel fitting 522 to attach to separate links. Other examples can include three or more such attachment points. The first link attachment point 540 and the forward aircraft panel attachment point 536 can be similar to that of the upper aircraft beam attachment point 532. The upper aircraft beam link 524, the first link attachment point 540, and the forward aircraft panel link 528 constitutes a first joint assembly.

Additionally, the lower aircraft beam link 526 is coupled to the lower aircraft beam attachment point 534 as well as coupled to the rearward aircraft panel link 530 at the second link attachment point 542. The rearward aircraft panel link 530 is also coupled to the panel fitting 522 at the rearward aircraft panel attachment point 538. The lower aircraft beam link 526, the second link attachment point 542, and the rearward aircraft panel link 530 constitutes a second joint assembly.

The forward aircraft panel link 528 is also coupled to the lower aircraft beam link 526 via the third link attachment point 544. Accordingly, when viewed from the side as in FIG. 5, the first joint assembly and the second joint assembly overlap. Such a configuration allows for the high clearance hinge linkage 302 to have a virtual hinge point (e.g., a center of rotation) to the left of at least a portion of the web 552, as viewed from the perspective of FIG. 5, when the access panel is in the closed position, as shown in FIG. 5. As such, an edge of the access panel 350 can be substantially aligned with a portion of the web 552.

FIG. 5 illustrates a reference line 558 collinear to an edge of the web 552 (e.g., the right side edge of the web 552 as shown in FIG. 5). The edge of the access panel 350, the leftmost edge as shown in FIG. 5, is substantially aligned or disposed past (e.g., to the left of the reference line 558 as shown in FIG. 5) the reference line 558. Such a configuration allows for the aircraft beam 304 to not include the additional beam material 214 of FIG. 2. Also, as the access panel 350 covers substantially all of a side of the lower flange 556, seal 212 of FIG. 2 is not needed in some examples.

Certain examples of the high clearance linkage 302 include fewer or more than the four links 524, 526, 528, and 530 shown in FIG. 5. Additionally, the linkages of certain other examples of the high clearance linkage 302 can include geometric relationships between the various links. Such relationships can include ratios in the end to end distances of the various links, whether links are curved or bent (e.g., to clear one or more other links), and/or other such relationships.

For example, the end to end distance of the attachment points of the upper aircraft beam link 524 can be between one-fourth to two times the length of the end to end distance of the attachment points of the forward aircraft panel link 528. The end to end distance of the lower aircraft beam link 526 can be between one-half to four times the end to end distance of the rearward aircraft panel link 530. The end to end distance of the upper aircraft beam link 524 can be between one-fourth to four times the end to end distance of the lower aircraft beam link 526.

Also, in certain examples, various links (e.g., the lower aircraft beam link 526 shown in FIG. 5) can be curved and/or kinked. As shown, the lower aircraft beam link 526 is not completely straight as the third link attachment point 544 is not within the virtual line formed by connecting the lower aircraft beam attachment point 534 and the second link attachment point 542. Other examples can include other links that are also not fully straight and/or includes one or more attachment points on the link that are not in line with that of other attachment points.

Figure 6A:
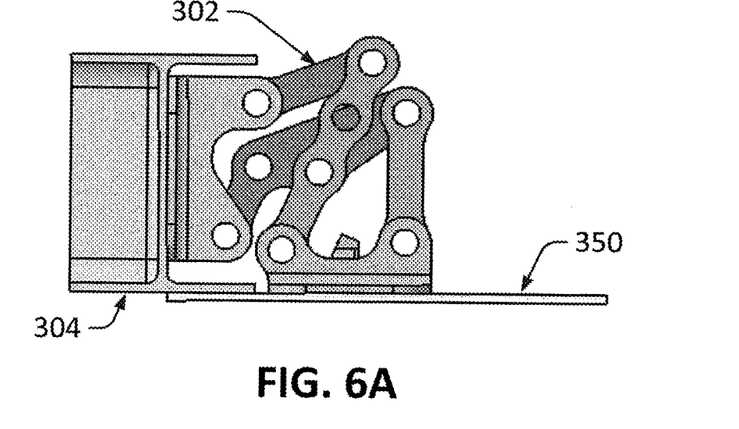
FIGS. 6A-F illustrate a sequence of operating an access panel with a high clearance hinge linkage in accordance with embodiments of the disclosure.

Links that include certain attachment points not in line with the attachment points of the other attachment points allow for tailoring of the virtual center of rotation of the high clearance hinge linkage 302 and/or the access panel 350 so that the access panel 350 does not interfere with the aircraft beam 304 when opening, as shown in FIGS. 6B-F, while still allowing for an edge of the access panel 350 to be substantially aligned with a portion of the aircraft beam 304 when in the closed position (e.g., is positioned past line 558 when in the closed position), as shown in FIG. 6A. In certain examples, the virtual center of rotation can shift as the high clearance hinge linkage 302 travels through its range of motion.

The high clearance hinge linkage 302 can also include one or more additional features. For example, the forward aircraft panel link 528 and the lower aircraft beam link 526 includes first joint hold open location 548 and second joint hold open location 546, respectively. The first joint hold open location 548 and the second joint hold open location 546 can be configured so that both are aligned with each other when the access panel 350 is moved to a certain position (e.g., an "open position" 90 degrees from the closed position). When the access panel 350 is moved to that position, a dowel, pin, or other mechanism can be inserted through both the forward aircraft panel link 528 and the lower aircraft beam link 526 to hold the position of the access panel 350 by substantially preventing movement of the high clearance hinge linkage 302.

The high clearance hinge linkage 302 also includes a travel stop 550. The travel stop 550 is configured to contact another portion of the high clearance hinge linkage 302 when the access panel 350 has moved to the open position or moved past the open position to prevent further movement of the access panel 350 and, thus, prevent the access panel 350 from interfering (e.g., hitting) a portion of the aircraft 50, as shown in FIG. 6F. In the example of FIG. 5, the travel stop 550 is configured to contact the rear aircraft panel link 530 when the access panel 350 has moved beyond the open position.

FIGS. 6A-F illustrate a sequence of operating an access panel 350 with a high clearance hinge linkage 302 in accordance with embodiments of the disclosure.

In FIG. 6A, the access panel 350 is in the closed position and the latches 310A-J are engaged to prevent the access panel 350 from opening. Thus, the access panel 350 is preventing access through the opening defined, at least in part, by the aircraft beam 304. The edge of the access panel 350 is substantially aligned with a portion of the web of the aircraft beam 304 when in the closed position shown in FIG. 6A. As such, the access panel 350 substantially covers an entire side of the lower flange of the aircraft beam 304.

Figure 6B:
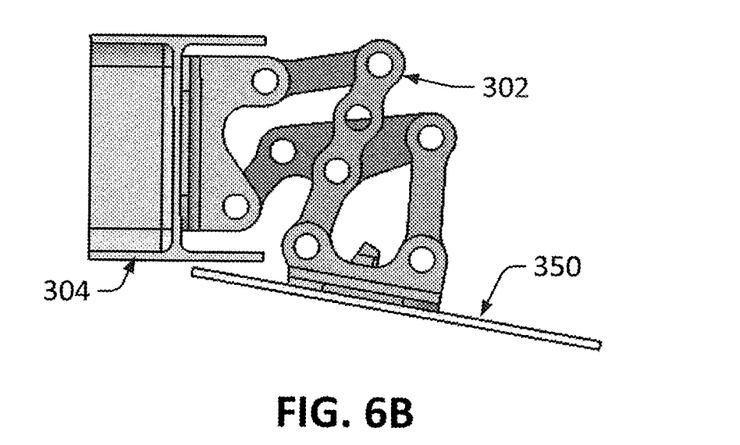

In FIG. 6B, the latches 310A-J are disengaged and the access panel 350 has started to be moved from the closed position. After disengaging the latches 310A-J, the access panel 350 may begin to open due to a pulling force from an operator, due to gravity pulling the access panel 310A-J downward (for access panel 350s mounted on an underside of the aircraft 50), due to hydraulics, actuators, and/or motors configured to open access panel 350, and/or due to other such techniques. Also, the virtual hinge point of the high clearance hinge linkage 302 is configured so that, even though an edge of the access panel 350 is substantially aligned with a portion of the web of the aircraft beam 304 when in the closed position, as shown in FIG. 6A, the access panel 350 does not interfere with the aircraft beam 304 when moving from the closed position as shown in FIG. 6B.

Figure 6C:
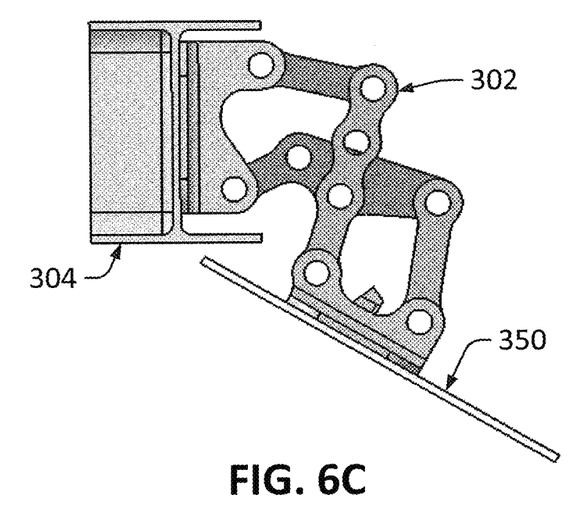
Figure 6D:
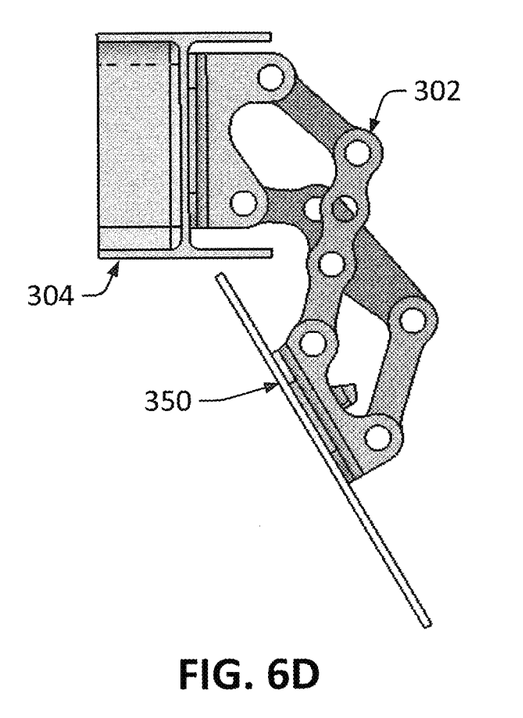
Figure 6E:
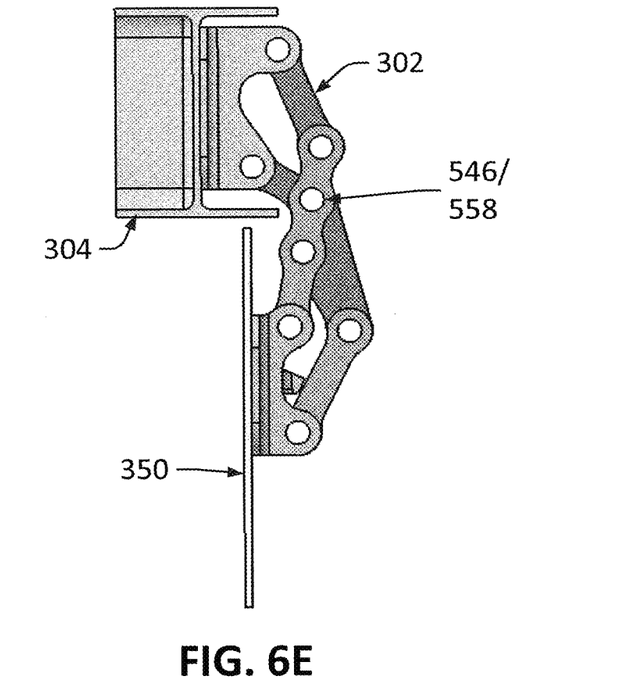
Figure 6F:
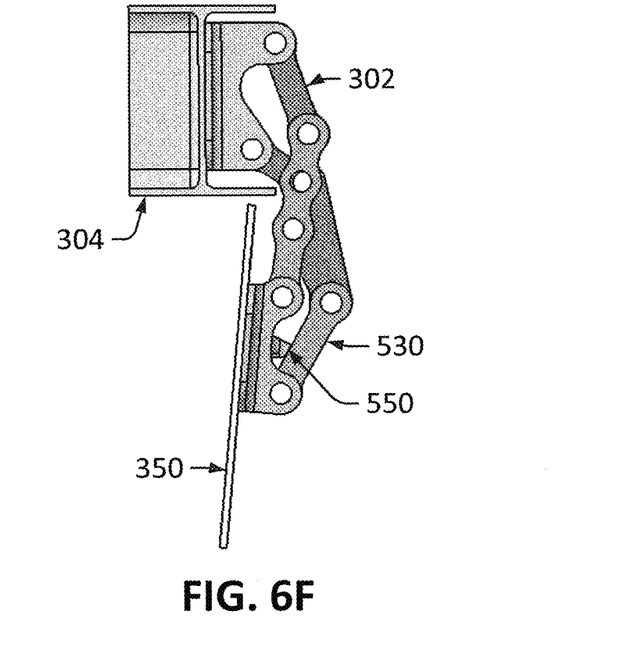

In FIG. 6C, the access panel 350 continues moving from the closed position shown in FIG. 6A to an open position (shown in FIG. 6E). Though the virtual hinge point can be moved from its position in FIGS. 6A and 6B, the access panel 350 continues to not interfere with the aircraft beam 304 as it continues moving.

In FIG. 6D, the access panel 350 continues to be moved towards the open position. In FIG. 6E, the access panel 350 has moved to the open position. In the open position shown in FIG. 6E, the access panel 350 is 90 degrees from the closed position. An open position 90 degrees from the closed position allows for gravity to aid in moving the access panel 350 to the open position. The access panel 350 can naturally move towards 90 degrees from the closed position due to gravity. In the open position, the first joint hold open location 548 and the second joint hold open location 546 are aligned. A pin, dowel, or other mechanism can thus be inserted into the closed position and the first joint hold open location 548 to hold the access panel 350 in the open position.

If a pin, dowel, or other mechanism is not inserted into the closed position and the first joint hold open location 548 to hold the access panel 350 in the open position, the access panel 350 can continue moving past the open position, as shown in FIG. 6F. If the access panel 350 continues moving past the open position, the travel stop 550 contacts the rearward aircraft panel link 530 to prevent further movement of the access panel 350 past the open position. The position where the travel stop 550 contacts the rearward aircraft panel link 530 can be referred to as the over travel position. The over travel position can be any position past the open position, such as within 5 degrees of the open position, within 10 degrees of the open position, or more than 10 degrees from the open position. In the over travel position, the first joint hold open location 548 and the second joint hold open location 546 are not aligned and thus a pin, dowel, or other mechanism cannot be inserted.

FIGS. 6A-F detail parts of the movement path of the access panel 350 controlled by the high clearance hinge linkage 302. The movement path of the access panel 350 can be shown as a swept volume. In certain examples, the swept volume of access panel 350 (and that of the high clearance hinge linkage 302) does not interfere with the aircraft beam 304 and any other portion of the aircraft 50. Other examples of the high clearance hinge linkage 302 can include one or more additional items, such as dampers, springs, and/or other mechanisms coupled to the linkage to damp movement of the access panel. The high clearance hinge linkage 302 and the access panel 304, as well as other components described herein, can be made from any material suitable for aircraft structures such as metals (e.g., aluminum, titanium, or steel) and composites (e.g., wood, fiberglass, glass reinforced plastics, carbon fiber, plastic, and/or other such materials).

Accordingly, described herein are apparatus and techniques high clearance hinge linkage 302. The hinge linkage 302 can be configured to couple to an aircraft beam 304 to an access panel 350 so that extraneous material of the beam 304 is reduced in weight and a seal 212 is eliminate as the access panel 350 can cover an entire side of the lower flange 556 of the beam 304. The hinge linkage 302 includes an aircraft beam fitting 520 configured to couple to a web 552 of the aircraft beam 304 and be disposed between an upper flange 554 and a lower flange 556 of the aircraft beam, an aircraft panel fitting 522 coupled to the aircraft panel 350, and a plurality of links 524, 526, 528, and 530. In certain examples, an edge of the access panel 350 is substantially aligned with a portion of the web 552 when the access panel 350 is in the closed position.

Examples described above illustrate but do not limit the invention. It should also be understood that numerous modifications and variations are possible in accordance with the principles of the present invention. Accordingly, the scope of the invention is defined only by the following claims.

What is claimed is:

1. A system comprising:
    a hinge linkage configured to couple an aircraft beam to an aircraft panel, the hinge linkage comprising:
        an aircraft beam fitting configured to couple to a web of the aircraft beam and be disposed between an upper flange and a lower flange of the aircraft beam;
        an aircraft panel fitting coupled to the aircraft panel;
        a plurality of links coupling the aircraft beam fitting to the aircraft panel fitting and configured to articulate to move the aircraft panel between at least a closed position and an open position, wherein an edge of the aircraft panel is substantially aligned with a portion of the aircraft beam web in the closed position; and
        the plurality of links comprises first and second joint assemblies each comprising associated first and second joint hold open locations, the first and second joint hold open locations configured to align with each other when the aircraft panel is moved to the open position to receive a locking pin to lock the first and second joint assemblies together and hold the aircraft panel in the open position.

2. The system of claim 1, wherein:
    the aircraft beam fitting comprises an upper aircraft beam attachment point and a lower aircraft beam attachment point;
    the aircraft panel fitting comprises a forward aircraft panel attachment point and a rearward aircraft panel attachment point; and
    the first joint assembly comprises an upper aircraft beam link coupled to the upper aircraft beam attachment point and a forward aircraft panel link coupled to the upper aircraft beam link and the forward aircraft panel attachment point, and
    the second joint assembly comprises a lower aircraft beam link coupled to the lower aircraft beam attachment point and a rearward aircraft panel link coupled to the lower aircraft beam link and the rearward aircraft panel attachment point.

3. The system of claim 2, wherein the lower aircraft beam link has a longer effective distance than the upper aircraft beam link and the forward aircraft panel link has a longer effective distance than the rearward aircraft panel link.

4. The system of claim 2, wherein the forward aircraft panel link is further coupled to the lower aircraft beam link to further define a travel path of the aircraft panel between the closed position and the open position.

5. The system of claim 1, further comprising an over travel stop configured to contact the hinge linkage when the aircraft panel is moved to an over travel position.

6. The system of claim 1, wherein a virtual hinge point location of the plurality of links is configured so that a swept volume of a travel path of the aircraft panel, moving between the closed position and the open position, does not intersect with the aircraft beam.

7. The system of claim 1, wherein the aircraft panel comprises a plurality of sides, one or more of the hinge linkages are disposed on a first side of the aircraft panel, and further comprising a plurality of latches, wherein at least one of the plurality of latches are disposed on each of the plurality of sides of the aircraft panel.

8. The system of claim 1, wherein the system is an aircraft, and wherein the aircraft comprises the aircraft beam and the aircraft panel.

9. The system of claim 1, further comprising:
    a wing;
    a fuselage; and
    an aircraft component disposed within the wing and/or the fuselage, wherein the aircraft panel is disposed on at least a portion of the wing and/or the fuselage, and wherein the aircraft panel covers at least a portion of the aircraft component in the closed position.

10. The system of claim 1, further comprising the locking pin.

11. A method comprising:
    moving an aircraft panel from a closed position to an open position, wherein movement of the aircraft panel from the closed position to the open position is controlled by a hinge linkage configured to couple an aircraft beam to an aircraft panel, the hinge linkage comprising:
        an aircraft beam fitting configured to couple to a web of the aircraft beam and be disposed between an upper flange and a lower flange of the aircraft beam;
        an aircraft panel fitting coupled to the aircraft panel;
        a plurality of links coupling the aircraft beam fitting to the aircraft panel fitting and configured to articulate to move the aircraft panel between at least a closed position and an open position, wherein an edge of the aircraft panel is substantially aligned with a portion of the aircraft beam web in the closed position; and
        the plurality of links comprises first and second joint assemblies each comprising associated first and second joint hold open locations, the first and second joint hold open locations configured to align with each other when the aircraft panel is moved to the open position to receive a locking pin to lock the first and second joint assemblies together and hold the aircraft panel in the open position.

12. The method of claim 11, wherein:
    the aircraft beam fitting comprises an upper aircraft beam attachment point and a lower aircraft beam attachment point;
    the aircraft panel fitting comprises a forward aircraft panel attachment point and a rearward aircraft panel attachment point; and
    the first joint assembly comprises an upper aircraft beam link coupled to the upper aircraft beam attachment point and a forward aircraft panel link coupled to the upper aircraft beam link and the forward aircraft panel attachment point, and
    the second joint assembly comprises a lower aircraft beam link coupled to the lower aircraft beam attachment point and a rearward aircraft panel link coupled to the lower aircraft beam link and the rearward aircraft panel attachment point.

13. The method of claim 12, wherein the lower aircraft beam link has a longer effective distance than the upper aircraft beam link and the forward aircraft panel link has a longer effective distance than the rearward aircraft panel link.

14. The method of claim 12, wherein the forward aircraft panel link is further coupled to the lower aircraft beam link to further define a travel path of the aircraft panel between the closed position and the open position.

15. The method of claim 11, further comprising:
   inserting the locking pin into the first and second joint hold open locations to hold the aircraft panel in the open position.

16. The method of claim 11, further comprising moving the aircraft panel to an over travel position, wherein, in the over travel position, an over travel stop contacts the hinge linkage.

17. The method of claim 11, wherein a virtual hinge point location of the plurality of links is configured so that a swept volume of a travel path of the aircraft panel, moving between the closed position and the open position, does not intersect with the aircraft beam.

18. The method of claim 11, further comprising:
   disengaging a plurality of latches before moving the aircraft panel from the closed position, wherein the aircraft panel comprises a plurality of sides, one or more of the hinge linkages are disposed on a first side of the aircraft panel, wherein the aircraft panel comprises the plurality of latches, and wherein at least one of the plurality of latches are disposed on each of the plurality of sides of the aircraft panel.

19. The method of claim 11, wherein the aircraft panel and the aircraft beam is disposed on an aircraft.

20. The method of claim 11, wherein the aircraft panel is disposed on at least a portion of a wing and/or a fuselage, and wherein the aircraft panel covers at least a portion of an aircraft component in the closed position.

* * * * *